US006705277B1

(12) United States Patent
McGee (10) Patent No.: US 6,705,277 B1
(45) Date of Patent: Mar. 16, 2004

(54) METHOD AND APPARATUS FOR DELIVERING MULTIPLE FUEL INJECTIONS TO THE CYLINDER OF AN ENGINE WHEREIN THE PILOT FUEL INJECTION OCCURS DURING THE INTAKE STROKE (75) Inventor: Brian G. McGee, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 449 days.

(21) Appl. No.: 09/616,102

(22) Filed: Jul. 13, 2000

(51) Int. Cl.$^7$ .................................. F02B 3/06
(52) U.S. Cl. .................... 123/299; 123/305; 123/27 R; 123/446
(58) Field of Search .................. 123/299, 300, 123/295, 305, 27 R, 436, 446, 472, 478, 492, 493; 701/104, 105, 110

(56) References Cited

U.S. PATENT DOCUMENTS

| | | |
|---|---|---|
| 4,571,683 A | 2/1986 | Kobayashi et al. |
| 4,576,135 A | 3/1986 | Johnson |
| 4,621,599 A | 11/1986 | Igashira et al. |
| 4,704,999 A | 11/1987 | Hashikawa et al. |
| 4,729,056 A | 3/1988 | Edwards et al. |
| 4,836,161 A | 6/1989 | Abthoff et al. |
| 4,922,878 A | 5/1990 | Shinogle et al. |
| 5,020,979 A | 6/1991 | Askew |
| 5,070,836 A | 12/1991 | Wahl et al. |
| 5,113,833 A | 5/1992 | Nagano et al. |
| 5,245,972 A | 9/1993 | Denz et al. |
| 5,267,545 A | 12/1993 | Kitson |
| 5,268,842 A | 12/1993 | Martson et al. |
| 5,277,164 A | 1/1994 | Takahashi et al. |
| 5,320,079 A | 6/1994 | Kuwabara |
| 5,379,733 A | 1/1995 | Haddick et al. |
| 5,427,072 A | 6/1995 | Udo |
| 5,427,083 A | 6/1995 | Ahern |
| 5,450,829 A | 9/1995 | Beck |
| 5,460,128 A | 10/1995 | Kruse |
| 5,492,098 A | 2/1996 | Hafner et al. |
| 5,499,608 A | 3/1996 | Meister et al. |
| 5,507,260 A | 4/1996 | Hintzen |

(List continued on next page.)

FOREIGN PATENT DOCUMENTS

EP 0 221 832 A2 5/1987

OTHER PUBLICATIONS

SAE Feb. 24–27, 1997 A New Concept for Low Emission Diesel Combusion—Printed from Diesel Engine Combustion Processes and Emission Control Technologies (SP–1246).

*Primary Examiner*—Willis R. Wolfe
*Assistant Examiner*—Hai Huynh
(74) *Attorney, Agent, or Firm*—Haverstock Garrett & Roberts (57) ABSTRACT

System and method for delivering multiple fuel injections to a cylinder of an engine based upon engine operating conditions, the control system including an electronic controller coupled to an electronically controlled fuel injector and a plurality of sensors for inputting certain signals representative of certain engine operating conditions, the controller being operable to output a fuel injection signal to the fuel injector to deliver a first fuel shot during the intake stroke and, in one embodiment, when the cylinder piston is positioned near top dead center during the intake stroke, a second fuel shot when the cylinder piston is positioned near top dead center during the compression stroke, and a third fuel shot when the cylinder piston is positioned near top dead center during the compression stroke. The first shot fuel quantity is preferably greater than the second shot fuel quantity but preferably less than the third shot fuel quantity.

45 Claims, 5 Drawing Sheets

U.S. PATENT DOCUMENTS

| | | |
|---|---|---|
| 5,540,205 A | 7/1996 | Davis et al. |
| 5,549,092 A | 8/1996 | Hasegawa et al. |
| 5,566,650 A | 10/1996 | Kruse |
| 5,566,660 A | 10/1996 | Camplin et al. |
| 5,588,415 A | 12/1996 | Ahern |
| 5,609,131 A | 3/1997 | Gray, Jr. et al. |
| 5,634,448 A | 6/1997 | Shinogle et al. |
| 5,647,317 A | 7/1997 | Weisman, II et al. |
| 5,678,521 A | 10/1997 | Thompson et al. |
| 5,685,273 A | 11/1997 | Johnson et al. |
| 5,701,870 A | 12/1997 | Gottshall et al. |
| 5,704,336 A | 1/1998 | Wrobel |
| 5,722,373 A | 3/1998 | Paul et al. |
| 5,732,680 A | 3/1998 | Ninomiya et al. |
| 5,740,775 A | 4/1998 | Suzuki et al. |
| 5,740,776 A | 4/1998 | Enderle et al. |
| 5,746,183 A | 5/1998 | Parke et al. |
| 5,778,850 A | 7/1998 | Buratti et al. |
| 5,794,585 A | 8/1998 | Yonezawa et al. |
| 5,803,049 A | 9/1998 | Harcombe |
| 5,832,901 A | 11/1998 | Yoshida et al. |
| 5,839,275 A | 11/1998 | Hirota et al. |
| 5,865,153 A | 2/1999 | Matsumoto |
| 5,865,158 A | 2/1999 | Cleveland et al. |
| 5,893,347 A | 4/1999 | McGee et al. |
| 5,970,950 A * | 10/1999 | Shimizu et al. .............. 123/295 |
| 5,979,398 A | 11/1999 | Yanagihara |
| 5,979,412 A | 11/1999 | Werner |
| 5,986,871 A | 11/1999 | Forck et al. |
| 6,000,384 A | 12/1999 | Brown et al. |
| 6,006,727 A | 12/1999 | Katashiba et al. |
| 6,009,849 A | 1/2000 | Yamanoto et al. |
| 6,014,956 A | 1/2000 | Cowden et al. |
| 6,021,370 A | 2/2000 | Bellinger et al. |
| 6,026,780 A | 2/2000 | Barnes et al. |
| 6,032,642 A | 3/2000 | Trumbower et al. |
| 6,044,824 A | 4/2000 | Mamiya et al. |
| 6,062,193 A * | 5/2000 | Gatellier ...................... 123/299 |
| 6,067,954 A * | 5/2000 | Kudou et al. ................ 123/299 |
| 6,085,730 A * | 7/2000 | Coatesworth et al. ....... 123/480 |
| 6,234,140 B1 * | 5/2001 | Mentgen et al. ............. 123/295 |
| 6,422,200 B1 * | 7/2002 | Morikawa et al. ........... 123/305 |
| 6,467,452 B1 * | 10/2002 | Duffy et al. ................. 123/299 |
| 6,491,016 B1 * | 12/2002 | Buratti ........................ 123/299 |
| 6,491,018 B1 * | 12/2002 | Duffy et al. ................. 123/299 |
| 6,513,320 B1 * | 2/2003 | Nishimura et al. ........... 60/285 |
| 6,516,773 B2 * | 2/2003 | Dutart et al. ................ 123/299 |
| 6,520,142 B2 * | 2/2003 | Nogi et al. .................. 123/299 |
| 2001/0056322 A1 * | 12/2001 | Yoshizawa et al. .......... 701/104 |

* cited by examiner

Fig. 1

METHOD AND APPARATUS FOR DELIVERING MULTIPLE FUEL INJECTIONS TO THE CYLINDER OF AN ENGINE WHEREIN THE PILOT FUEL INJECTION OCCURS DURING THE INTAKE STROKE

TECHNICAL FIELD

This invention relates generally to an engine control system and, more particularly, to a method and apparatus for delivering multiple fuel injections to the cylinder of an engine during a fuel injection event wherein the pilot shot is delivered during the intake stroke to improve fuel atomization and control exhaust emissions.

BACKGROUND ART

Electronically controlled fuel injectors are well known in the art including both hydraulically actuated electronically controlled fuel injectors as well as mechanically actuated electronically controlled fuel injectors. Electronically controlled fuel injectors typically inject fuel into a specific engine cylinder as a function of an injection signal received from an electronic controller. These signals include waveforms that are indicative of a desired injection rate as well as the desired timing and quantity of fuel to be injected into the cylinders.

Emission regulations pertaining to engine exhaust emissions are becoming more restrictive throughout the world including, for example, restrictions on the emission of hydrocarbons (HC), carbon monoxide, the release of particulates, and the release of nitrogen oxides ($NO_x$). Tailoring the number of injections and the injection rate of fuel to a combustion chamber, as well as the quantity and timing of such fuel injections, is one way in which to control emissions and meet such emission standards. As a result, multiple fuel injection techniques have been utilized to modify the burn characteristics of the combustion process in an attempt to reduce emission and noise levels. Multiple injections typically involve splitting the total fuel quantity to the cylinder during a particular injection event into a plurality of fuel injections such as two separate fuel injections, such as a pilot injection and a main injection. At different engine operating conditions, it may be necessary to use different injection strategies in order to achieve both desired engine operation and emissions control. As used throughout this disclosure, an injection event is defined as the injections that occur in a cylinder during one cycle of the engine. For example, one cycle of a four cycle engine for a particular cylinder, includes an intake, compression, expansion, and exhaust stroke. Therefore, the injection event in a four stroke engine includes the number of injections, or shots, that occur in a cylinder during the four strokes of the piston. The term shot as used in the art may also refer to the actual fuel injection or to the command current signal to a fuel injector or other fuel actuation device indicative of an injection or delivery of fuel to the engine.

The timing of the various fuel injections, the pressure and quantity of fuel associated with each fuel injection or fuel shot, the number of injections, and the time delay between each fuel injection or fuel shot will control the type of combustion achieved and the resulting exhaust emissions based upon the particular operating conditions of the engine. For example, if the pilot fuel does not sufficiently atomize before combustion or light off, or if the fuel coats the cylinder wall, a non-uniform fireball or flame front may occur during ignition causing incomplete combustion. This results in hydrocarbons and other emission constituents being exhausted to the atmosphere. The same can likewise be true if the multiple fuel injections occur too close together within a given fuel injection event, or if the timing sequence between the multiple injections is sufficiently large as to likewise result in poor air/fuel mixing, coating the cylinder walls with fuel, allowing fuel to be injected beyond a desired stopping point, and/or other factors resulting in incomplete combustion. In addition, if two fuel injections are closely coupled in time to each other, rate shaping effects will produce a fuel quantity delivered which may be different from the desired fuel quantity. All of these situations can adversely affect exhaust emissions and fuel economy.

In the past, the controllability of split injections has been somewhat restricted by mechanical and other limitations associated with the particular types of injectors utilized. In addition, in some embodiments, such as disclosed in the patent U.S. Pat. No. 5,740,775, the total fuel quantity associated with a split injection is apportioned such that approximately 50% of the fuel is associated with the first fuel shot and approximately 50% of the fuel is associated with the second fuel shot. Under the more restrictive emissions regulations of today, this fuel partitioning strategy yields higher than desirable hydrocarbons and excessive fuel dilution of the oil, even with the first injection is advanced into the early portion of the compression stroke, or even into the intake stroke. Even with more advanced electronically controlled injectors, during certain engine operating conditions, it is sometimes difficult to accurately control fuel delivery, even when utilizing current control signals.

It is therefore desirable to control the delivery of the multiple fuel injections during a single fuel injection event so as to achieve better fuel atomization, better emissions control, and better fuel economy.

Accordingly, the present invention is directed to overcoming one or more of the problems as set forth above.

DISCLOSURE OF THE INVENTION

In one aspect of the present invention there is disclosed an electronically controlled fuel injection system which is capable of delivering multiple fuel injections to a particular cylinder of an internal combustion engine during a single injection event such as three of more fuel shots generally referred to as first or pilot shot, a second or main shot, a third or anchor shot, and a post ignition shot. When delivering the first or pilot fuel shot, the present system delivers the pilot shot during the intake stroke and, preferably, when the cylinder piston is located at or near the start of the intake stroke when the piston is high in the cylinder and the cylinder pressure is relatively low. Depending upon when the pilot fuel shot is injected or delivered during the intake stroke, this injection timing will prevent and/or at least reduce the possibility that the fuel from the pilot shot will directly hit the cylinder wall and such injection timing will provide better mixing and atomization of the fuel with the air in the cylinder as the piston moves through both the intake and compression strokes. In addition, a more uniform fireball or flame front is achieved when the pilot shot is ignited during the compression stroke due to improved fuel atomization and other factors. The main and/or anchor fuel injections are then delivered during the compression stroke, or shortly thereafter, into the uniform flame front at a slightly higher pressure as compared to delivery of the pilot fuel injection. In this regard, the second or main fuel injection shot as well as a third or anchor fuel injection shot will preferably take place when the cylinder position is near top dead center during the compression stroke. In some situations, the main and/or anchor fuel shots may occur or continue to occur when the cylinder position is near top dead center during the power stroke. The present system also includes means for varying the timing and fuel quantity associated with each fuel injection shot as well as the time interval between the various fuel injection shots based upon the particular operating conditions of the engine and based upon the desired results.

These and other aspects and advantages of the present invention will become apparent upon reading the detailed description in connection with the drawings and appended claims.

BRIEF DESCRIPTION OF THE DRAWINGS

For a better understanding of the present invention, reference may be made to the accompanying drawings in winch.

BEST MODE FOR CARRYING OUT THE INVENTION

Figure 1:
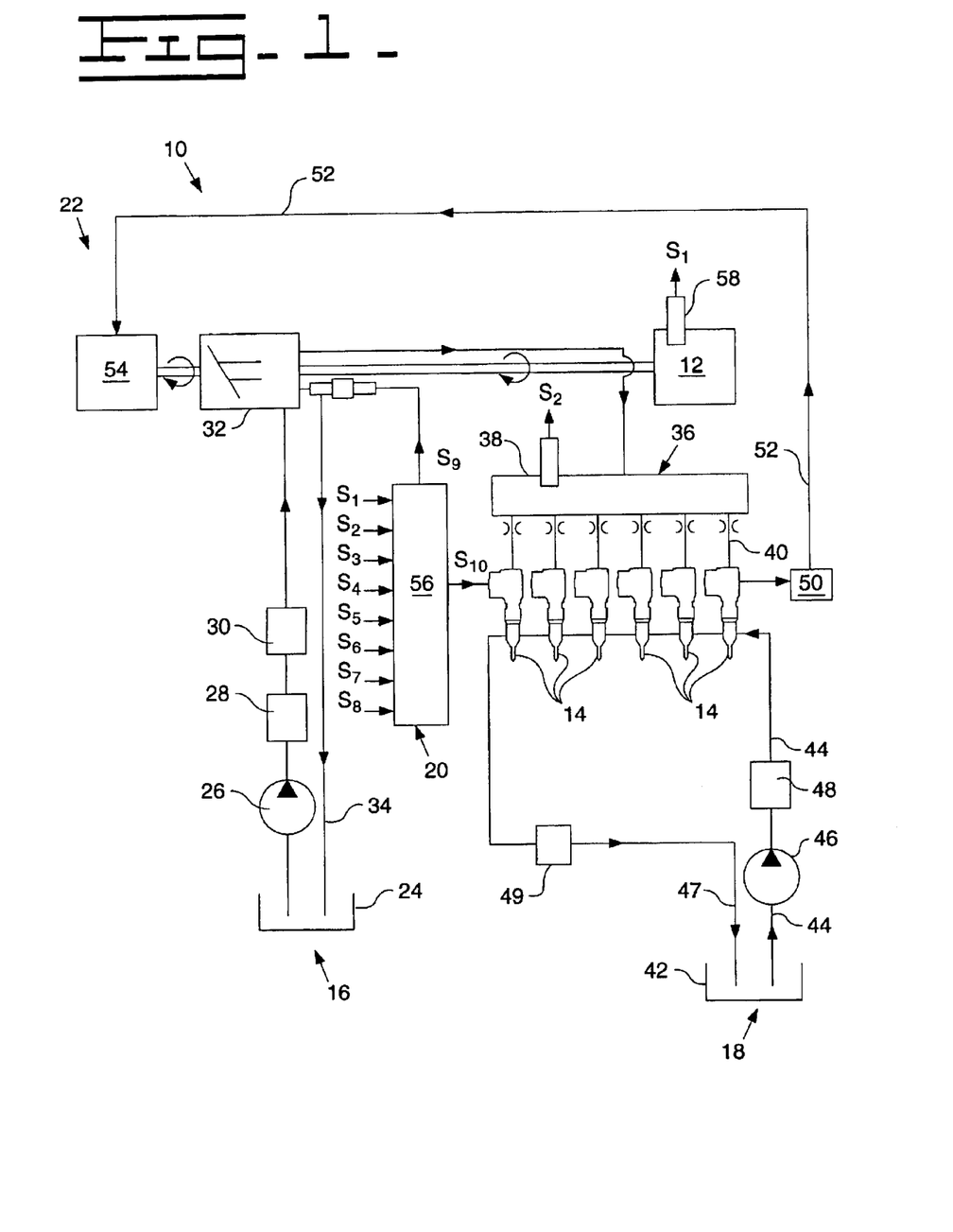
FIG. 1 is a typical schematic view of an electronically controlled injector fuel system used in connection with one embodiment of the present invention.

Referring to FIG. 1, there is shown one embodiment of a hydraulically actuated electronically controlled fuel injection system 10 in an exemplary configuration as adapted for a direct-injection compression ignition engine 12, preferably having a fixed compression ratio. The present invention applies to direct-injection compression ignition engines capable of running at any engine speeds, including low, medium, high, and very high engine speeds. Very high engine speeds includes engines running at 4000 rpm and above. Fuel system 10 includes one or more electronically controlled fuel injection devices 14 which are adapted to be positioned in a respective cylinder head bore of the engine 12. The fuel injection devices are illustrated as fuel injectors in this embodiment. While the embodiment of FIG. 1 applies to an in-line six cylinder engine, it is recognized and anticipated, and it is to be understood, that the present invention is also equally applicable to other types of engines such as V-type engines and rotary engines, and that the engine may contain any plurality of cylinders or combustion chambers. In addition, while the embodiment of FIG. 1 also illustrates a hydraulically actuated electronically controlled fuel injector system, it is likewise recognized and anticipated that the present invention is also equally applicable to other types of fuel injection devices, including electronically controlled injectors, mechanically actuated electronically controlled injector units as well as fluid activated common rail type fuel injection systems with digitally controlled fuel valves.

The fuel system 10 of FIG. 1 includes an apparatus or means 16 for supplying actuation fluid to each injector 14, an apparatus or means 18 for supplying fuel to each injector, electronic control means 20 for controlling the fuel injection system including the manner and frequency in which fuel is injected by the injectors 14 including timing, number of injections per injection event, fuel quantity per injection, time delay between each injection, and the injection profile. The system may also include apparatus or means 22 for recirculating fluid and/or recovering hydraulic energy from the actuation fluid leaving each injector 14.

The actuating fluid supply means 16 preferably includes an actuating fluid sump or reservoir 24, a relatively low pressure actuating fluid transfer pump 26, a actuating fluid cooler 28, one or more actuation fluid filters 30, a high pressure pump 32 for generating relatively high pressure in the actuation fluid, and at least one relatively high pressure actuation fluid manifold or rail 36. A common rail passage 38 is arranged in fluid communication with the outlet from the relatively high pressure actuation fluid pump 32. A rail branch passage 40 connects the actuation fluid inlet of each injector 14 to the high pressure common rail passage 38. In the case of a mechanically actuated electronically controlled injector, manifold 36, common rail passage 38 and branch passages 40 would typically be replaced with some type of cam actuating arrangement or other mechanical means for actuating such injectors. Examples of a mechanically actuated electronically controlled fuel injector unit are disclosed in U.S. Pat. Nos. 5,947,380 and 5,407,131.

Apparatus 22 may include a waste accumulating fluid control valve 50 for each injector, a common recirculation line 52, and a hydraulic motor 54 connected between the actuating fluid pump 32 and recirculation line 52. Actuation fluid leaving an actuation fluid drain of each injector 14 would enter the recirculation line 52 that carries such fluid to the hydraulic energy recirculating or recovering means 22. A portion of the recirculated actuation fluid is channeled to high pressure actuation fluid pump 32 and another portion is returned to actuation fluid sump 24 via recirculation line 34.

In a preferred embodiment, the actuation fluid is engine lubricating oil and the actuating fluid sump 24 is an engine lubrication oil sump. This allows the fuel injection system to be connected as a parasitic subsystem to the engine's lubricating oil circulation system. Alternatively, the actuating fluid could be fuel or some other type of liquid.

In the illustrated embodiment, the fuel supply means 18 preferably includes a fuel tank 42, a fuel supply passage 44 arranged in fluid communication between the fuel tank 42 and the fuel inlet of each injector 14, a relatively low pressure fuel transfer pump 46, one or more fuel filters 48, a fuel supply regulating valve 49, and a fuel circulation and return passage 47 arranged in fluid communication between each injector 14 and fuel tank 42. In an alternative embodiment, the fuel supply means 18 may vary to support the needs of different fuel injection devices, such as digitally controlled fuel valves.

Electronic control means 20 preferably includes an electronic control module (ECM) 56, also referred to as a controller, the use of which is well known in the art. ECM 56 typically includes processing means such as a microcontroller or microprocessor, a governor such as a proportional integral derivative (PID) controller for regulating engine speed, and circuitry including input/output circuitry, power supply circuitry, signal conditioning circuitry, solenoid driver circuitry, analog circuits and/or programmed logic arrays as well as associated memory. The memory is connected to the microcontroller or microprocessor and stores instruction sets, maps, lookup tables, variables, and more. ECM 56 may be used to control many aspects of fuel injection including (1) the fuel injection timing, (2) the total fuel injection quantity during an injection event, (3) the fuel injection pressure, (4) the number of separate injections or fuel shots during each injection event, (5) the time intervals between the separate injections or fuel shots, (6) the time duration of each injection or fuel shot, (7) the fuel quantity associated with each injection or fuel shot, (8) the actuation fluid pressure, (9) current level of the injector waveform, and (10) any combination of the above parameters. Each of such parameters are variably controllable independent of engine speed and load. ECM 56 receives a plurality of sensor input signals $S_1$–$S_8$ which correspond to known sensor inputs such as engine operating conditions including engine speed, engine load, engine temperature, pressure of the actuation fluid, cylinder piston position and so forth that are used to determine the precise combination of injection parameters for a subsequent injection event.

For example, an engine temperature sensor 58 is illustrated in FIG. 1 connected to engine 12. In one embodiment, the engine temperature sensor includes an engine oil temperature sensor. However, an engine coolant temperature sensor can also be used to detect the engine temperature. The engine temperature sensor 58 produces a signal designated by $S_1$ in FIG. 1 and is inputted to ECM 56 over line $S_1$. In the particular example illustrated in FIG. 1, ECM 56 issues control signal $S_9$ to control the actuation fluid pressure from pump 32 and a fuel injection signal $S_{10}$ to energize a solenoid or other electrical actuating device within each fuel injector thereby controlling fuel control valves within each injector 14 and causing fuel to be injected into each corresponding engine cylinder. Each of the injection parameters are variably controllable, independent of engine speed and load. In the case of the fuel injectors 14, control signal $S_{10}$ is a fuel injection signal that is an ECM commanded current to the injector solenoid or other electrical actuators.

Figure 2:
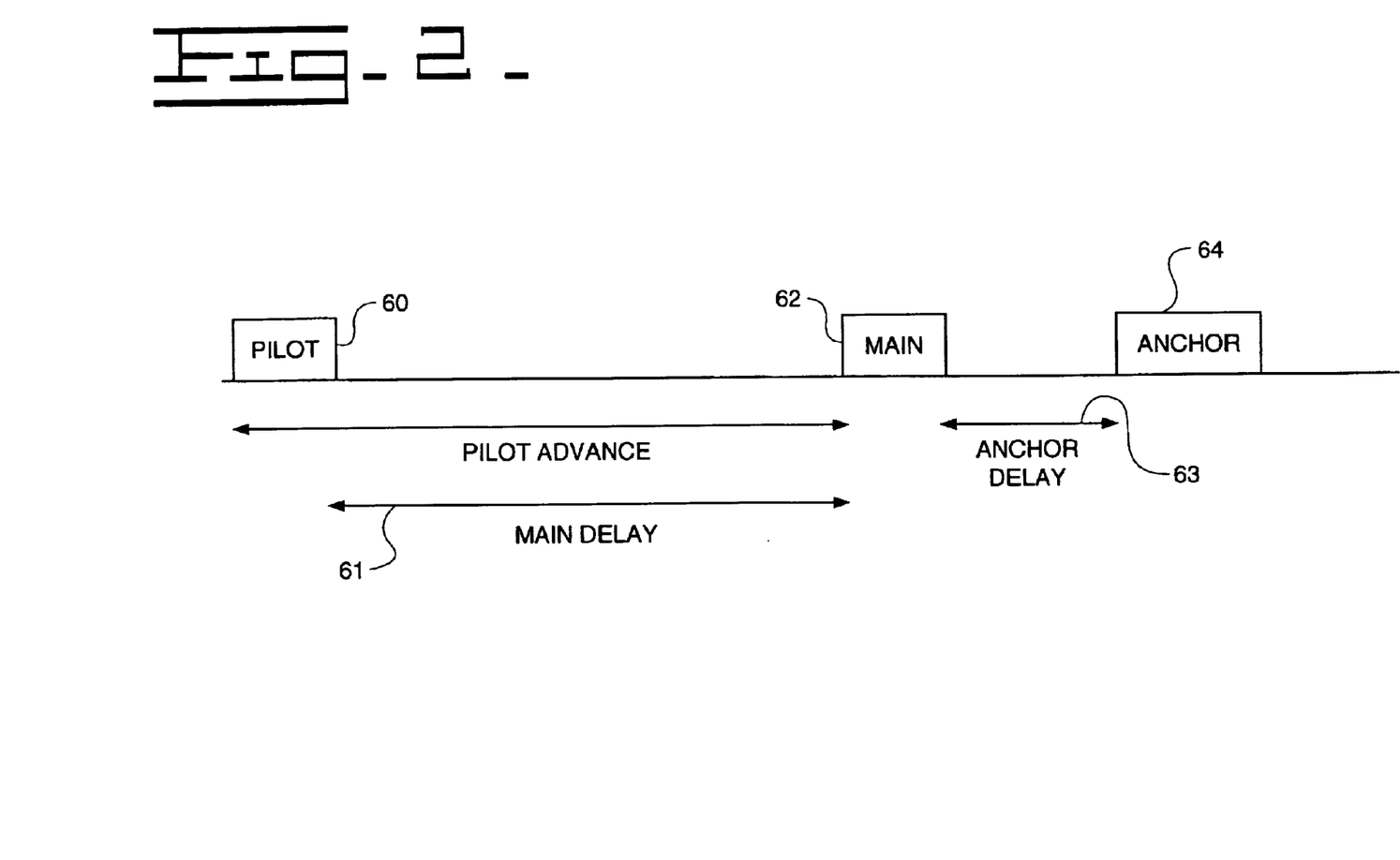
FIG. 2 is a schematic profile of a three shot fuel injection event.

It is recognized that the type of fuel injection desired during any particular fuel injection event will typically vary depending upon various engine operating conditions. In an effort to improve emissions, it has been found that delivering multiple separate fuel injections to a particular cylinder during a fuel injection event at certain engine operating conditions achieves both desired engine operation as well as emissions control. FIG. 2 illustrates a multiple injection including three separate fuel injections, namely, a first fuel injection or pilot shot 60, a second fuel injection or main shot 62, and a third fuel injection or anchor shot 64. As illustrated in FIG. 2, the pilot shot 60 is injected into the combustion chamber in advance of the main shot 62 by some predetermined time factor, crank angle or main delay 61, and the anchor shot is sequenced after the main shot 62 based upon a predetermined time factor, crank angle or anchor delay 63. Based upon programming associated with electronic controller 56 as well as a variety of different maps and/or lookup tables stored within the memory of controller 56 including maps and/or tables relating to engine speed, engine load, the pressure associated with rail passage 38 (rail pressure), desired total fuel quantity and other parameters, controller 56 will be able to dynamically determine the appropriate number of fuel shots, the quantity of fuel required for each fuel shot 60, 62 and 64 and partition the same accordingly, and it will be able to determine the timing and duration of each individual shot as well as the anchor delay 63. In the three shot multiple injection depicted in FIG. 2, a portion of the total fuel to be delivered to the combustion chamber will be injected by the pilot shot 60, a portion of such total fuel will be injected by the main shot 62, and the remaining portion of the total fuel to be injected will be injected by the anchor shot 64. Under certain engine operating conditions, a three shot multiple fuel injection has advantages in terms of exhaust emissions, including reduced particulate emissions and/or reduced $NO_x$ emissions as well as desired engine performance.

Figure 3:
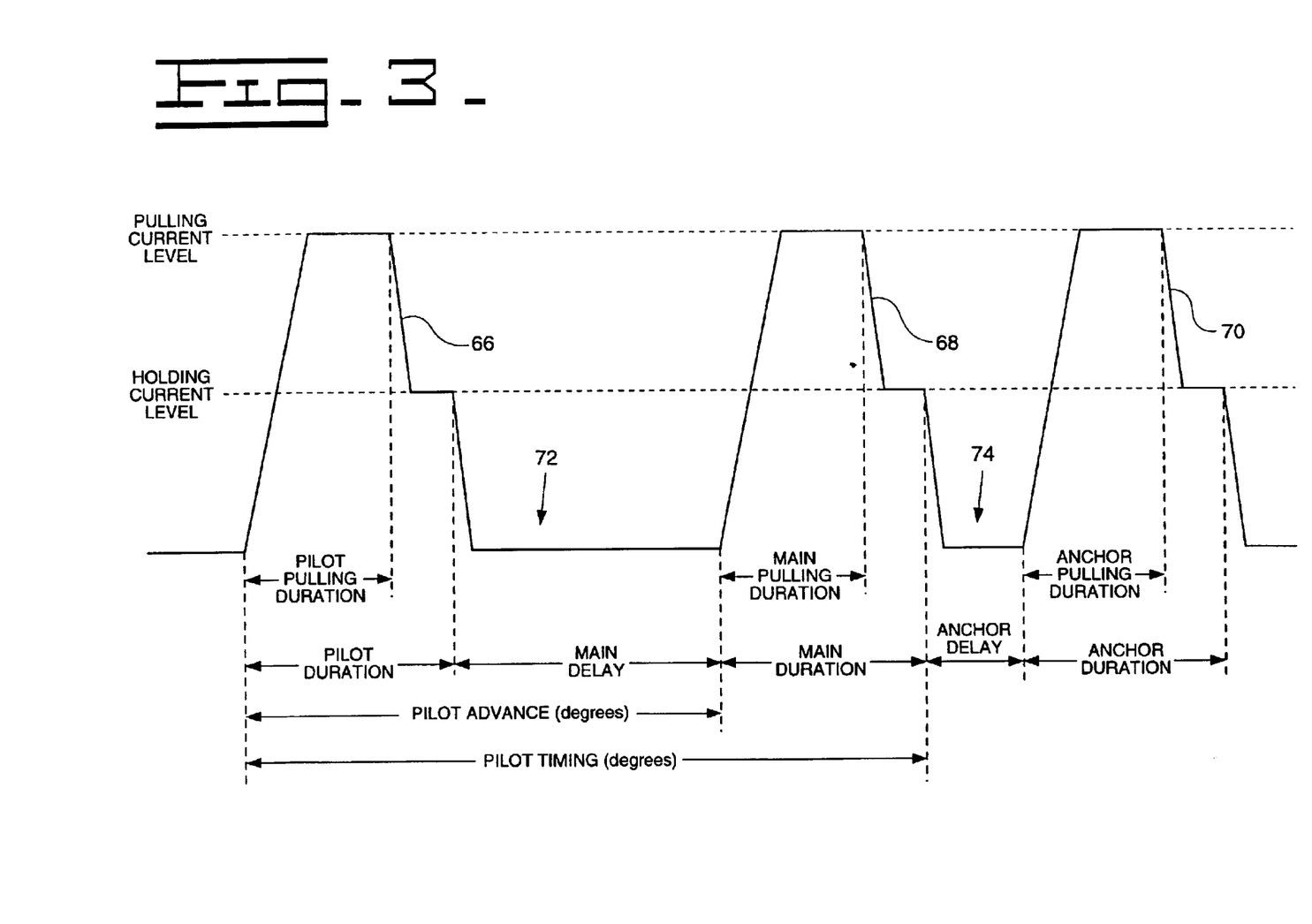
FIG. 3 is a schematic diagram of an exemplary current waveform for a three shot injection event.

An exemplary current waveform for a three shot injection event is illustrated in FIG. 3 showing a first or pilot shot control signal 66, a second or main shot control signal 68, a third or anchor shot control signal 70, a main delay signal 72 between the pilot and main shots, and an anchor delay signal 74 between the main and anchor shots. The duration of each of the pilot shot 66, main shot 68, and the anchor shot 70 control signals may be varied by ECM 56, and the duration of delays 72 and 74 can likewise be controlled by ECM 56. In a preferred embodiment, the timing and duration of the pilot and main shots are determined and set by ECM 56 and the timing and duration of the anchor shot is thereafter determined based upon the main shot timing. In this regard, the anchor shot timing will be determined based upon a time delay based upon termination of the main shot. Other methods for determining the various parameters associated with the three fuel injection shots are likewise recognized and anticipated.

FIG. 3 also illustrates the pull-in and hold in current levels associated with a typical hydraulically actuated electronically controlled fuel injector. When using hydraulically actuated electronically controlled fuel injectors, the injection signal includes generally a two-tier form that includes a pull-in current level and a generally lower hold-in current level. The higher pull-in current is used to quickly open the fuel injector and thereby decrease the response time, that is, the time between the initiation of a fuel injection signal and the time in which fuel actually begins to enter the engine cylinder. Once fuel injection has commenced, a lower level hold-in current can be used to hold the injector open for the remainder of the injection event. The pilot, main and anchor pull-in durations are likewise illustrated in the representative current waveform depicted in FIG. 3. Based upon engine operating conditions, the type of fuel and fuel injectors being utilized, and other parameters, it is recognized and anticipated that the waveform illustrated in FIG. 3 may be modified and altered accordingly. It is also recognized that other mechanisms such as latching valves may be utilized with certain types of fuel injectors wherein different waveforms from that depicted in FIG. 3 will be required and wherein no hold-in current will be necessary.

Figure 4:
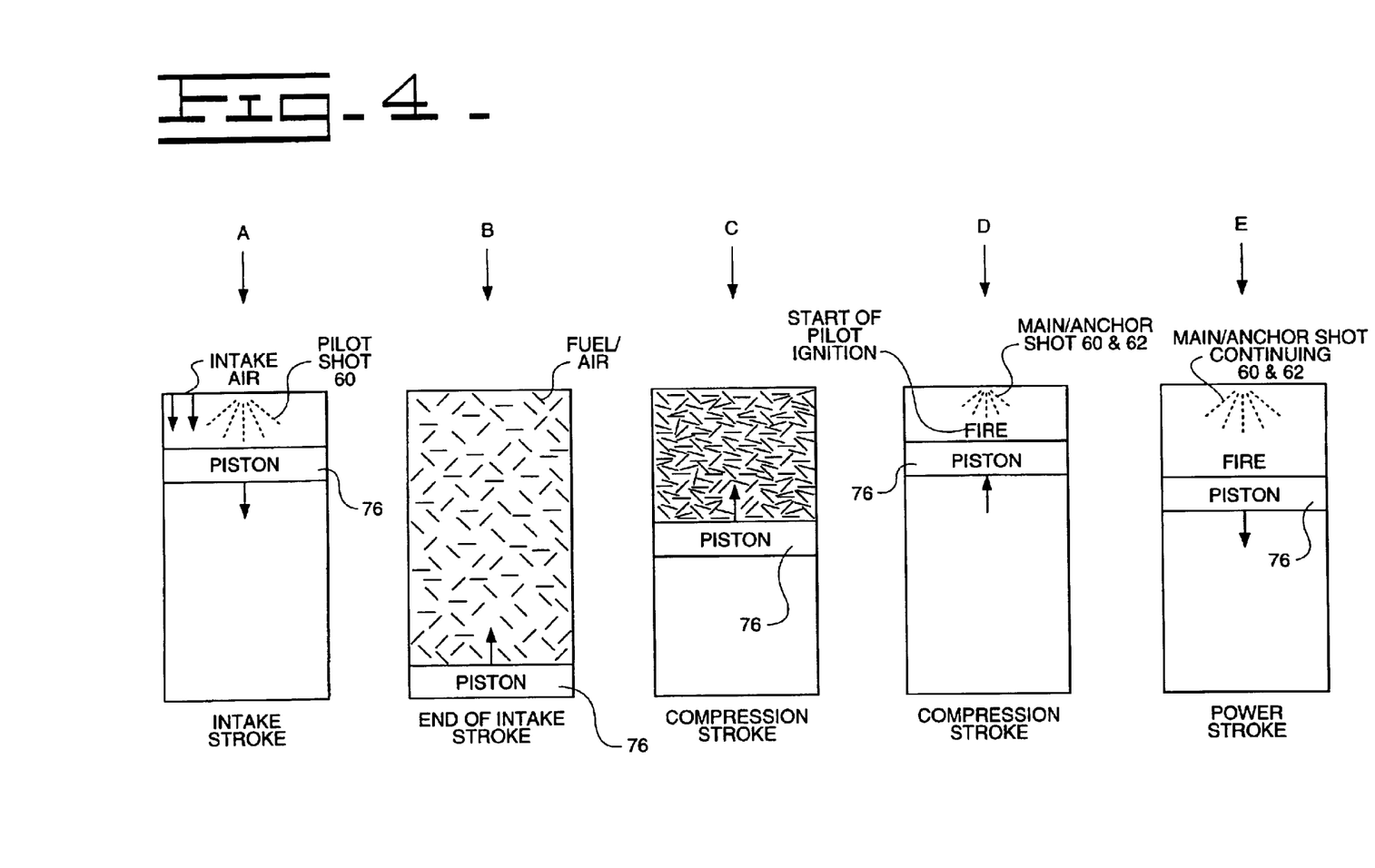
FIG. 4 is an exemplary schematic illustration of one embodiment of a multiple fuel shot injection event delivered in accordance with the teachings of the present invention.

It has been found that a more uniform mixture of fuel and air (fuel atomization) can be achieved if the pilot fuel shot of a multiple fuel injection is delivered during the intake stroke and, in a preferred embodiment, at or near the start of the intake stroke when the cylinder piston is high in the cylinder and the cylinder pressure is low. This is best illustrated in FIG. 4 which represents a schematic illustration of the intake, compression, and power strokes of a typical cylinder piston wherein multiple fuel shots such as the first or pilot shot 60, the second or main shot 62, and the third or anchor shot 64 are delivered to the combustion chamber in accordance with the teachings of a preferred embodiment of the present invention. More particularly, as best illustrated in view A of FIG. 4, when cylinder piston 76 has just started the intake stroke, that is, piston 76 is at or near top dead center and is starting to move downward as illustrated, the air intake valve is open and the exhaust port valve is closed or will soon close. Pressure in the cylinder is low at this point in time because most of the air and exhaust gases have been removed or purged from the cylinder via the exhaust port valve which was open during the previous exhaust stroke. There is therefore low air pressure in the cylinder at the start of the intake stroke. Also, rail pressure or fuel injection pressure will be relatively low if the pilot shot is injected at this point in time because, due to cylinder timing, a main and/or anchor shot combination has just previously occurred in another cylinder and such injection pressure will not have had sufficient time to fully recover by the time the pilot shot is delivered at the start of the intake stroke. Alternatively, the rail pressure can likewise be decreased for a short period of time, if necessary, so as to perform the pilot shot injection.

As the piston 76 begins its movement downward during the intake stroke, air is drawn into the cylinder through the open intake air valve and air is allowed to fill the cylinder. Delivering the pilot fuel shot just after the start of the intake stroke allows the fuel to be injected at a lower injection pressure substantially into the piston bowl or onto the upper piston surface thereby substantially preventing such fuel from hitting or being sprayed directly onto the cylinder wall. Also, since the piston 76 is high in the cylinder, there will be less cylinder wall exposed for fuel contact. If the piston 76 is low in the cylinder when the pilot fuel is injected, you may get some fuel spray on the cylinder walls which may dilute the lubricating oil coating such walls. Also, if the piston 76 is low in the cylinder during the intake stroke, the fuel has a lesser amount of time to mix with the air in the cylinder as compared to introducing the pilot shot at or near top dead center. This may result in a less enhanced mixing and combustion process. On the other hand, in the preferred embodiment, when the first or pilot fuel shot is introduced at or near top dead center of the intake stroke, such fuel has the entire intake stroke to mix with the air in the cylinder as it vaporizes off of the piston surface as best shown in view B of FIG. 4. Also, since the cylinder pressure is low at the beginning of the intake stroke, the air entering the cylinder will have more swirl or turbulence as it moves into and through the cylinder during the intake stroke thus enhancing the fuel/air mixing process as the piston 76 moves to the bottom dead center position illustrated in view B of FIG. 4. This swirl or turbulence, plus the extended time for fuel/air mixing, enhances fuel atomization and may help keep fuel from contacting the cylinder wall. In other words, the air turbulence generated by the air entering through the intake valve in combination with the low fuel injection pressure, normal diffusion, and the piston 76 being high in the cylinder prevents the pilot shot fuel from directly hitting the cylinder wall and allows the pilot shot to more thoroughly mix with the air in the cylinder, when such first fuel shot is injected at or near the beginning of the intake stroke. The lower pressure near the piston top surface due to cavitation as the piston moves downward during the intake stroke also enhances both fuel vaporization and air/fuel mixing. Although injecting the first or pilot fuel shot at or near the beginning of the intake stroke is generally preferred, introducing the pilot fuel shot anywhere during the intake stroke will still enhance fuel atomization and the overall combustion process as compared to introducing the pilot fuel shot during the compression stroke, although other problems such as exposing the cylinder walls to fuel and possible dilution of the lubricating oil may occur.

Near the end of the intake stroke, the air intake valve will close and the piston 76 will begin moving upward on the compression stroke as best illustrated in view C of FIG. 4. As the fuel and air are compressed during the compression stroke, such compression pressure likewise further thoroughly mixes the fuel and air before combustion. In this regard, based upon a predetermined fuel quantity for the first or pilot shot based upon the particular operating conditions of the engine, it has been found that the pilot fuel/air mixture will combust during the compression stroke when the cylinder piston 76 is displaced between a range from approximately 20° to approximately 12° before top dead center during a compression stroke. It is recognized and anticipated that such combustion may occur outside of this range due to several factors including the fuel quantity associated with the pilot shot, the injector current waveform, rail or injector pressure, engine speed, engine load and other parameters. Nevertheless, regardless of where the pilot shot is delivered during the intake stroke and regardless of when pilot shot ignition occurs, a more uniform flame front is achieved when the pilot fuel is combusted due to better fuel atomization and less fuel being sprayed onto the cylinder wall.

The subsequent fuel shots associated with a multiple fuel injection, such as the main and/or anchor shot, may be delivered directly into the flame front of the pilot shot. This can be desirable depending upon engine operating conditions because such fuel will be more thoroughly combustible when injected into the pilot flame front. In this regard, the main and anchor fuel shots are generally injected at a relatively higher rail or injection pressure as compared to the pilot fuel shot since the rail pressure for the main and anchor shots has now had sufficient time to recover to the proper injection pressure. This also lends itself to better fuel atomization. This is best illustrated in view D of FIG. 4.

Although the anchor shot 64 typically occurs at a fixed delay from the end of the main injection 62, such as at a delay of approximately 0.20 to 0.75 milliseconds from the end of the main shot 62, under certain operating conditions, the proximity of the main and anchor shots and the resultant internal injector hydraulics may lead to a rate shaping effect of the anchor injection. As a result, a distinct third injection may not always be apparent although an injection rate trace would generally indicate a drop in the injection rate between the main and anchor shots. In this situation, because the main and anchor shots typically occur close together, the duration of the anchor delay may be insufficient to produce a distinct split between the main and anchor shots, that is, a significant reduction in the fuel flow rate between these two fuel shots is not realized. This occurrence is referred to as a boot condition or a boot mode of operation and is also known as rate shaping the anchor fuel shot. A boot type of fuel delivery generates a different quantity of fuel delivered to the cylinder as compared to a distinct split type fuel delivery since in a boot type delivery, the fuel injection flow rate does not go to zero between the respective fuel shots. Conversely, in a split fuel delivery, the fuel injection flow rate may go to zero, between the respective fuel shots. As a result, more fuel is generally delivered in a boot type delivery as compared to a split fuel delivery between the main and anchor fuel shots. Depending upon the operating conditions of the engine, desired engine performance and desired emissions output, and other factors and/or parameters, it may be desirable and advantageous, in certain situations, to deliver the main and anchor fuel shots in a split mode and, in other situations, it may be desirable and advantageous to deliver the main and anchor fuel shots in a boot condition. The present control system is capable of dynamically determining the appropriate parameters associated with a particular multiple fuel injection event to yield either a split or a boot type fuel delivery based upon the particular engine operating conditions.

The delivery of the main and/or anchor fuel shots may therefore continue past top dead center of the combustion stroke and into the power stroke so as to yield either a split or a boot type fuel delivery as best illustrated in view E of FIG. 4. For example, under certain operating conditions, the start of the main injection or second shot 62 may be injected when the cylinder piston 76 is displaced or located in a range of approximately 30° before top dead center during the compression stroke to approximately 30° after top dead center of the compression stroke and during the power stroke. The start of the anchor injection or third shot 64 may likewise be injected when the cylinder piston 76 is displaced or located in a range from approximately 8° before top dead center during the compression stroke to approximately 18° after top dead center of the compression stroke and during the power stroke. All of these injection parameters are dependent upon engine operating conditions and although it is generally preferred that the main and anchor shots be delivered into the flame front of the combustion of the pilot shot, it is possible under certain conditions to have the main shot delivered either before or after the pilot shot combust. Even in this particular situation, better fuel atomization still occurs due to the extended period of time for fuel atomization as well as the higher injection pressure of both the main and anchor fuel shots which likewise facilitates better fuel atomization. If the main fuel shot 62 is delivered prior to combustion of the pilot fuel shot, pilot fuel combustion will typically occur shortly thereafter still producing a more uniform flame front. Regardless of when combustion of the pilot fuel occurs, a more complete combustion occurs due to a more uniform flame front.

In a multiple fuel injection event, it has also been determined that allocating the total fuel quantity associated with a particular fuel injection event between the respective fuel shots associated with that particular injection event in accordance with a specific fuel quantity relationship between the individual fuel shots will yield better emissions control. In particular, when the present invention utilizes a pilot, main and anchor shot, the quantity of fuel associated with the pilot shot is greater than the quantity of fuel associated with the main shot but less than the quantity of fuel associated with the anchor shot. The relationship of the pilot shot being greater than the main shot but less than the anchor shot improves desired emissions. In addition, when only two shots are utilized, e.g., a main and an anchor shot, the main shot is again less than the anchor shot. In other words, the main fuel shot has the smallest quantity of fuel and the anchor fuel shot has the largest quantity of fuel, the quantity of fuel associated with the pilot shot being generally therebetween.

Figure 5:
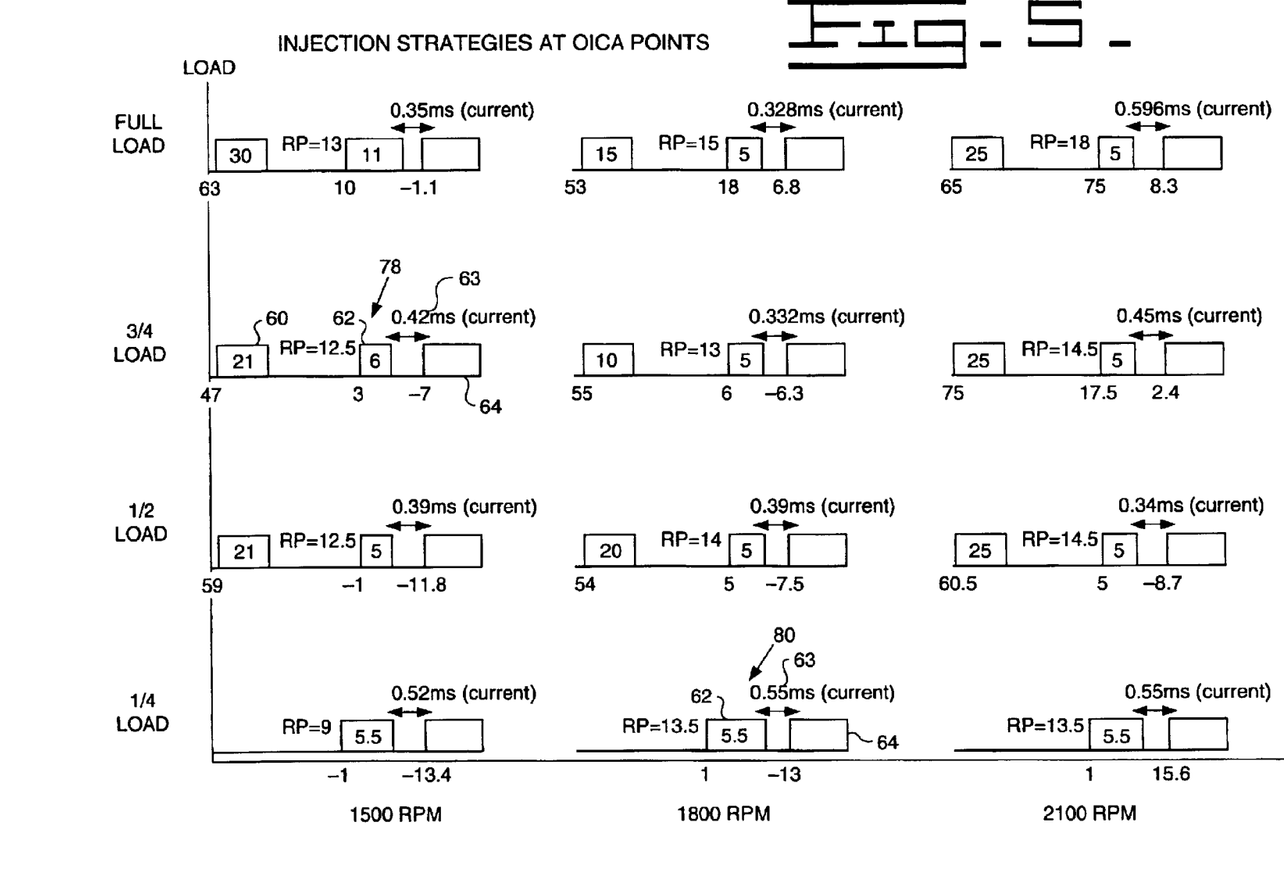
FIG. 5 is a chart illustrating an example of the injection strategies for steady state emissions taken at certain engine operating conditions based upon engine speed and engine load.

FIG. 5 illustrates an example of one embodiment of injection strategies of the present invention, and the associated fuel distribution relationships, for steady state emissions for a selected engine at certain engine operating conditions based upon engine speed and engine load. The numbers in FIG. 5 are for illustrative purposes only and may change for each engine and rating in a given engine family. As can be seen from FIG. 5, the injection strategies illustrated in FIG. 5 disclose the various multiple injection events including three shot multiple events which will yield desired emissions control as well as desired engine performance at the various engine speeds and engine loads depicted therein. Engine load is the amount of work being performed by the engine at a particular point in time and is generally defined in terms of rated engine load or work capacity. Engine load can be measured by a wide variety of different methods known in the art such as by using the total quantity of fuel delivered to the engine for a particular task or work operation as an indicator of engine load. As noted in FIG. 5, the number of shots, the quantity of fuel associated with each of the first, second and third shots, the timing delay sequence between shots, the rail pressure and the displacement or position of the piston during the compression and power strokes may vary based upon engine speed and engine load.

Referring to FIG. 5 the letters RP represent rail pressure (in units of MPa), the numbers within the boxes represent the fuel quantity associated with that particular fuel shot (in $mm^3$), the numbers below the horizontal line represent the displacement of the piston during a particular stroke (the positive numbers referring to the number of degrees before top dead center (BTDC) and the negative numbers referring to the number of degrees after top dead center (ATDC)), and the number located between and above the second and third shots represents the electronic time delay or anchor delay between the second and third shots. Referring to multiple injection event 66 (FIG. 3) at an engine speed of approximately 1,500 RPM and an engine load of approximately ¾ of rated engine load, the number 21 associated with the first or pilot shot 60 represents 21 cubic millimeters of fuel to be allocated to the pilot shot at a rail pressure of 12.5 MPa (megapascals) during this particular injection event, whereas only six cubic millimeters of fuel are electronically allocated to the second or main shot 62. The third or anchor shot 64 will then receive the remaining amount of total fuel determined for this particular event based upon engine speed, engine load and other parameters. The number 0.42 in injection event 66 represents a 0.42 millisecond delay in current being supplied to the injector solenoid between the second and third shots (anchor delay). The second or main shot will take place when the cylinder piston is located at or corresponds to approximately 3° before top dead center during the compression stroke, and the third or anchor shot will take place when the cylinder piston is located at or corresponds to approximately 7° after top dead center during the power stroke.

As can be seen from a review of the various injection events depicted in FIG. 5, and in particular the three shot injection events, the quantity of fuel partitioned to each individual shot, the rail pressure, the anchor delay, and the angular displacement of the cylinder piston with respect to each individual shot may vary based upon the operating conditions of the engine. All of the injection events depicted in FIG. 5 were determined by an electronically controlled fuel system similar to the system 10 depicted in FIG. 1 and all such injection events produced improved exhaust emissions.

Referring again to FIG. 5, it can be seen that the number of fuel injections may be dynamically reduced during varying speed or load conditions. For example, only two injection shots may be desired at an engine load condition of ¼ of rated engine load to achieve desired exhaust emissions. In this case, the pilot shot has been eliminated and the main shot and anchor shot are sequenced in accordance with the parameters indicated in FIG. 5. For example, referring to injection event 68 which represents a typical injection event for a given engine type at approximately 1800 RPM and an engine load of approximately ¼ of rated engine load, 5.5 cubic millimeters of fuel is allocated to the main shot and the remaining amount of total fuel determined for this particular event will be allocated to the anchor shot. Fuel will be delivered at a rail pressure of 13.5 MPa during this particular injection event and a delay of 0.55 milliseconds in the current being supplied to the injector solenoid or other electrical actuating device will take place between the main and anchor shots. Also, the main shot will occur when the cylinder piston is located at or corresponds to approximately 1° before top dead center during the compression stroke whereas the anchor shot will take place when the cylinder piston is located at or corresponds to approximately 13° after top dead center during the power stroke. Under these particular operating conditions, as discussed, it is advantageous and desirable for emission purposes to allocate a smaller amount of fuel to the main shot and a larger amount of fuel to the anchor shot. A smaller main shot and a large anchor shot split injection strategy can therefore provide advantages in terms of exhaust emissions, including reduced particulate emissions and/or reduced $NO_x$ emissions at relatively low engine loads without going to a three shot injection event. In fact, it has been found that if a three shot injection is utilized at certain low engine loads, an increase in hydrocarbons (HC) as compared to just a main and anchor shot occurs due to the impingement of the pilot shot onto the cylinder walls. As a result, a split injection method (e.g., main and anchor shot only) often times yields better emission results in this engine operating range. The present control system can therefore dynamically adapt to the engine operating conditions and dynamically determine the number of fuel shots, the quantity and placement of each such shot and the other associated injection parameters accordingly.

Depending on the operating conditions, the pilot fuel shots are allocated approximately 5% to 40% of the total fuel delivered to the fuel injecting devices during a particular fuel injection event, the main fuel shots are allocated approximately 3% to 40% of the total fuel delivered during a particular injection event, and the anchor fuel shots are allocated the remaining total fuel to be delivered during a particular injection event. For example, at a medium to heavy engine load ¾ to full load) and a generally high engine speed, an exemplary fuel quantity relationship between the respective fuel shots may be such that the pilot shot may have 20% of the fuel, the main shot may have 10% of the fuel, and the anchor shot may have 70% of the fuel. In an alternative embodiment, and in accordance with the fuel quantity relationship discussed above, fuel may be apportioned such that the pilot shot receives approximately 15% to 25% of the total fuel delivered, the main shot receives approximately 5% to 10% of the total fuel delivered, and the anchor shot receives the remaining fuel to be delivered, that is, approximately 60% to 80% of the total fuel delivered. Other distribution ranges are likewise possible wherein the fuel quantity associated with the pilot shot is greater than the fuel quantity associated with the main shot but less than the fuel quantity associated with the anchor shot. This fuel partitioning strategy is important because it provides for better emissions control during varying engine operating conditions, and it does so without utilizing exhaust gas recirculation (EGR) devices or equipment. Even where a two shot multiple injection event is used, e.g., low engine loads, it is also generally advantageous and desirable for emission purposes to allocate a smaller amount of fuel to the main shot and a larger amount of fuel to the anchor shot. As mentioned above, a smaller main shot and a larger anchor shot split injection strategy can therefore provide advantages in terms of exhaust emissions, including reduced particulate emissions and/or reduced $NO_x$ emissions at relatively low engine loads without goint to a three shot injection event.

If too much fuel is allocated to the pilot shot such as approaching 50% of the fuel, an increase in hydrocarbons (HC) will occur thereby undesirably increasing emissions. Still further, to achieve desiredcompression ignition, it is also desirable that the pilot shot should have enough fuel associated therewith for pre-ignition to occur via compression and without the use of a spark.

As used herein, engine load is the amount of work being performed by the engine at a particular point in time and is generally defined in terms of rated engine load or work capacity. Engine load can be measured by a wide variety of different methods known in the art such as by using the total quantity of fuel delivered to the engine for a particular task or work operation as an indicator of engine load. Engine torque and throttle position can likewise be used as indicators for measuring engine load.

Injecting fuel into an engine cylinder in accordance with the delivery techniques discussed above results in better burn characteristics during the combustion process which leads to better fuel management, better emissions control and lower noise levels.

The actual timing of the fuel injections is implementation dependent. For example, in one embodiment, the third fuel shot, or anchor shot, may occur approximately 0.20 to 0.75 milliseconds after the second fuel shot. However this time delay is implementation dependent and will vary significantly depending on the speed of the engine. For example an engine have a maximum rated engine speed in the low speed range will have different actual injection timing and timing delays than an engine capable of running at very high speeds, e.g., 4000 rpm and above. Therefore, the timing relationships provided, such as those illustrated in FIG. 3, are provided for exemplary purposes and will vary dependent in part on the engine implementation used.

INDUSTRIAL APPLICABILITY

Utilization of an injection method and system in accordance with the present invention provides for better emissions control during varying engine operating conditions as explained above. Although the particular injection waveform for delivering multiple fuel injections may vary depending upon the particular engine operating conditions, the present system is capable of dynamically determining the timing associated with each individual fuel injection, the injection duration, any delays between injections, and the displacement of the cylinder piston relative to the beginning of each injection regardless of the type of electronically controlled fuel injectors or digitally controlled valves or common rail fuel system being utilized, regardless of the type of engine being utilized, and regardless of the type of fuel being utilized. In this regard, appropriate fuel maps relating rail or injection pressure, engine speed, engine load, pilot/main/anchor duration times, pilot/main/anchor fuel quantities, anchor timing delay, and other parameters can be stored or otherwise programmed into ECM 56 for use during all operating conditions of the engine. These operational maps, tables and/or mathematical equations stored in the ECM programmable memory determine and control the various parameters associated with the appropriate multiple injection events to achieve desired emissions control.

It is also recognized that the particular ambient conditions under which the engine will be operating will affect the amount of emissions produced by the engine. As the ambient conditions change, so will the engine exhaust emissions. As a result, the multiple fuel injection events may have to be adjusted in order to keep the engine emissions within desirable limits based upon ambient conditions. These adjustments may include adjustments to the pilot injection timing and quantity, the main injection timing and quantity, the delay between the pilot and main injections, and the delay between the main and anchor injections, all of which are preferably accomplished while maintaining the general fuel quantity relationship or strategy between the respective fuel shots as discussed above. Ambient conditions can be monitored by providing and coupling appropriate sensors to ECM 56. High altitude or cold start conditions are examples of ambient conditions which may affect emissions and may require ECM 56 to adjust the parameters of the multiple fuel injection events.

It is also recognized that the fuel injection spray angle, the valving associated with the cylinders, and other injector/piston/cylinder characteristics can be modified to achieve a narrow fuel spray angle so as to further ensure that the pilot fuel as well as the main and/or anchor fuel will not be sprayed directly onto the cylinder walls thereby further improving emissions control. Still further, because a more uniform and bigger flame front is produced by delivering the pilot shot during the intake stroke, introducing the main and/or anchor shots at a narrower spray angle may likewise not be as important as in the past because of the better burn characteristics.

Separating the pilot fuel shot from the main and/or anchor fuel shots as taught by the present invention has the additional advantage of preventing any intercommunication or overlapping between the pilot shot and the main and/or anchor shots within a single injection event. This is a programmed way of reducing hydraulic mechanical interactions between fuel shots thereby further ensuring that the desired fuel quantity is delivered. For example, when the pilot shot is delivered to one cylinder during the intake stroke, a main and/or anchor shot may be delivered to another cylinder shortly thereafter. This sequencing can be programmed into ECM 56. This translates into windows of piston displacement associated with each cylinder for each of the respective fuel injection shots. These allotted windows for each of the respective shots can be dynamically changed on the fly based upon the programming associated with ECM 56. In fact, because of this programmed separation, the rate shaping of the main/anchor fuel shot group may likewise not be as important due to the more uniform pilot fuel flame front achieved by the present invention. This results in improved timing and improved delivered fuel quantity accuracy. Other advantages are likewise recognized and anticipated.

Although fuel system 10 illustrated in FIG. 1 has been shown as a representative six injector system, it is recognized that the present invention could be incorporated into fuel injection systems including any number of fuel injectors as well as both hydraulically actuated and mechanically actuated electronically controlled fuel injector units as well into a fluid activated common rail fuel system. Where mechanically actuated electronically controlled fuel injectors are used, the rail or manifold 36 in FIG. 1 will typically be replaced with a mechanical actuating mechanism for causing each injector to pressurize fuel such as the mechanisms illustrated in U.S. Pat. Nos. 5,947,380 and 5,407,131. Other mechanisms for accomplishing this task are likewise known and available.

As is evident from the forgoing description, certain aspects of the present invention are not limited by the particular details of the examples illustrated herein and it is therefore contemplated that other modifications and applications, or equivalence thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A fuel injection control system for injecting fuel into a cylinder of a compression ignition engine during a fuel injection event, the cylinder having a piston movable therein through a plurality of piston strokes and having an electronically controlled fuel injector associated therewith, said fuel injection control system comprising;

an electronic controller coupled to said fuel injector;

at least one sensor coupled to said controller for inputting at least one signal thereto representative of an operating condition of the engine;

said controller being operable to output a fuel injection signal to said fuel injector to deliver a plurality of fuel shots to the cylinder during a fuel injection event based upon said at least one sensor signal;

said controller being operable to apportion a total fuel quantity to be injected into the engine cylinder during the fuel injection event between said plurality of fuel shots;

said controller being operable to deliver approximately 5% to 40% of the total fuel quantity to be injected during the fuel injection event to the first fuel shot; and said controller being operable to deliver a first fuel shot during the intake stroke.

2. The fuel injection control system as set forth in claim 1 wherein said controller is operable to deliver the first fuel shot when the cylinder piston is positioned near top dead center during the intake stroke.

3. The fuel injection control system as set forth in claim 1 wherein said controller is operable to deliver a second fuel shot when the cylinder piston is positioned near top dead center during the compression stroke.

4. The fuel injection control system as set forth in claim 3 wherein said controller is operable to deliver a third fuel shot when the cylinder piston is positioned near top dead center during the compression stroke.

5. The fuel injection control system as set forth in claim 4 wherein said first fuel shot ignites during the compression stroke and said third fuel shot is delivered into the flame front formed by ignition of said first fuel shot.

6. The fuel injection control system as set forth in claim 4 wherein said third fuel shot is delivered when the cylinder piston is positioned between a range from approximately 8° before top dead center to approximately 18° after top dead center during the compression stroke.

7. The fuel injection control system as set forth in claim 4 wherein said controller is operable to deliver the third fuel shot approximately 0.20 to 0.75 milliseconds after the second fuel shot.

8. The fuel injection control system as set forth in claim 3 wherein said controller is operable to deliver a third fuel shot when the cylinder piston is positioned near top dead center during the power stroke.

9. The fuel injection control system as set forth in claim 3 wherein said first fuel shot combusts during the compression stroke and said second fuel shot is delivered into the flame front formed by combustion of said first fuel shot.

10. The fuel injection control system as set forth in claim 3 wherein said second fuel shot is delivered when the cylinder piston is positioned between a range from approximately 30° before top dead center to approximately 30° after top dead center during the compression stroke.

11. The fuel injection control system as set forth in claim 1 wherein said first fuel shot combusts during the compression stroke.

12. The fuel injection control system as set forth in claim 1 wherein said controller is operable to deliver approximately 15% to 25% of the total fuel quantity to be injected during the fuel injection event to the first fuel shot.

13. The fuel injection control system as set forth in claim 1 wherein the fuel injection event includes a second shot and a third shot, the quantity of fuel associated with the first fuel shot being greater than the quantity of fuel associated with the second fuel shot but less than the quantity of fuel associated with the third fuel shot.

14. A fuel injection control system for injecting fuel into a cylinder of a compression ignition engine during a fuel injection event, the cylinder having a piston movable therein and having an electrically controlled fuel injector associated therewith, said fuel injection control system comprising:

an electronic controller coupled to said fuel injector;

at least one sensor coupled to said controller for inputting certain signals thereto representative of certain operating conditions of the engine;

said controller being operable to output a fuel injection signal to said fuel injector to deliver a first, a second, and a third fuel shot to the cylinder during a fuel injection event based upon said at least one sensor input;

said controller being operable to apportion a total fuel quantity to be injected into the cylinder during a fuel injection event between said first, second and third fuel shots such that the first shot fuel quantity is greater than the second shot fuel quantity but less than the third shot fuel quantity; and said controller being operable to deliver said first fuel shot during the intake stroke.

15. The fuel injection control system as set forth in claim 14 wherein said controller is operable to deliver a first fuel shot when the cylinder piston is displaced near top dead center after the start of the intake stroke.

16. The fuel injection control system as set forth in claim 14 wherein said controller is operable to deliver said second fuel shot when the cylinder piston is displaced between a range from approximately 30° before top dead center to approximately 30° after top dead center during the compression stroke.

17. The fuel injection control system as set forth in claim 14 wherein said controller is operable to deliver said third fuel shot when the cylinder piston is displaced between a range from approximately 8° before top dead center to approximately 18° after top dead center during the compression stroke.

18. The fuel injection control system as set forth in claim 14 wherein at least one of the signals inputted to said controller from said at least one sensor is representative of the engine speed.

19. The fuel injection control system as set forth in claim 14 wherein said first fuel shot combusts during the compression stroke.

20. The fuel injection control system as set forth in claim 19 wherein said first fuel shot combusts when the cylinder piston is displaced between a range from approximately 20° to approximately 12° before top dead center during the compression stroke.

21. The fuel injection control system as set forth in claim 14 wherein said controller is operable to deliver approximately 5% to 40% of the total fuel quantity to be injected during a fuel injection event to said first fuel shot.

22. The fuel injection control system as set forth in claim 21 wherein said controller is operable to deliver approximately 3% to 40% of the total fuel quantity to be injected during a fuel injection event to said second fuel shot.

23. The fuel injection control system as set forth in claim 22 wherein said controller is operable to deliver the remaining portion of the total fuel to be injected during a fuel injection event to said third fuel shot.

24. A method for delivering fuel to a cylinder of a compression ignition engine during a particular fuel injection event wherein the fuel injection to the cylinder is provided by a fuel injecting device, the method comprising the steps of:

sensing an engine speed;

dynamically determining the number of fuel injections to be included in the fuel injection event in response to the sensed engine speed;

determining the quantity of fuel associated with each of said fuel injections to be delivered during the particular fuel injection event;

apportioning approximately 5% to 40% of the total fuel quantity determined for all of said fuel injections to be delivered during the particular injection event to the first fuel injection;

determining a fuel injection signal indicative of the number of fuel injections and the respective fuel quantities associated therewith to be delivered during the particular fuel injection event; and delivering the fuel injection signal to the fuel injecting device wherein the first fuel injection is injected into the cylinder during the intake stroke.

25. The method as set forth in claim 24 wherein said first fuel injection is injected when the cylinder piston is displaced near top dead center during the intake stroke.

26. The method as set forth in claim 24 wherein a second fuel injection is injected into the cylinder when the cylinder piston is displaced near top dead center during the compression stroke.

27. The method as set forth in claim 26 wherein a third fuel injection is injected into the cylinder when the cylinder piston is displaced near top dead center during a compression stroke.

28. The method as set forth in claim 27 wherein the first fuel injection combusts during the compression stroke and the third fuel shot is injected into the flame front formed by combustion of the first fuel injection.

29. The method as set forth in claim 27 wherein the third fuel injection is injected when the cylinder piston is displaced between a range from approximately 8° before top dead center to approximately 18° after top dead center during the compression stroke.

30. The method as set forth in claim 26 wherein a third fuel injection is injected into the cylinder when the cylinder piston is displaced after top dead center during the exhaust stroke.

31. The method as set forth in claim 26 wherein the first fuel injection combusts during the compression stroke and the second fuel injection is injected into the flame front formed by combustion of the first fuel injection.

32. The method as set forth in claim 26 wherein the second fuel injection is injected when the cylinder piston is displaced between a range from approximately 30° before top dead center to approximately 30° after top dead center during the compression stroke.

33. The method as set forth in claim 24, wherein the fuel injection event includes a second shot and a third shot, the quantity of fuel associated with the first fuel shot being greater than the quantity of fuel associated with the second fuel shot but less than the quantity of fuel associated with the third fuel shot.

34. The method as set forth in claim 24 including the step of:

apportioning approximately 3% to 40% of the total fuel quantity determined for all of said fuel injections to be delivered during the particular injection event to a second fuel injection.

35. The method as set forth in claim 24 including the step of:

apportioning the remaining portion of the total fuel quantity determined for all of said fuel injections to be delivered during the particular injection event to a third fuel injection.

36. A method for delivering a first, second and third fuel shot to a cylinder of a compression ignition engine during a particular fuel injection event wherein the fuel injection to the cylinder is provided by an electronically controlled fuel injector, the fuel injector being electronically attached to an electronic controller, the method comprising the steps of:

sensing an engine speed;

determining a total fuel quantity to be delivered during injection as a function of at least the sensed engine speed and an established engine load;

determining the first shot fuel quantity to be delivered during injection;

determining the second shot fuel quantity to be delivered during injection;

determining the third shot fuel quantity to be delivered during injection, wherein the first shot is larger in quantity than the second shot, and the third shot is larger in quantity than the first shot;

delivering the first pilot shot when the cylinder piston is displaced near top dead center after the start of the intake stroke;

delivering the second fuel shot when the cylinder piston is displaced between a range from approximately 30° before top dead center to approximately 30° after top dead center during the compression stroke; and delivering the third fuel shot when the cylinder piston is displaced between a range from approximately 8° before top dead center to approximately 18° after top dead center during the compression stroke.

37. The method as set forth in claim 36 wherein said first fuel shot combust during the compression stroke and said second fuel shot is delivered into the flame front formed by combustion of said first fuel shot.

38. The method as set forth in claim 36 wherein said first fuel shot combust during the compression stroke and said third fuel shot is delivered into the flame front formed by combustion of said first fuel shot.

39. A method of delivering a first, second and third fuel shot to a cylinder of a compression ignition engine during a particular fuel injection event wherein fuel injection is provided by a fuel injecting device, the method including the steps of:

sensing an engine speed;

establishing an engine load;

determining the quantity of fuel associated with each of said first, second and third fuel shots such that the first shot fuel quantity is greater than the second shot fuel quantity but less than the third shot fuel quantity;

delivering a fuel injection signal representative of the first, second and third fuel shots to the fuel injection device; and delivering the first fuel shot during the intake stroke.

40. The method as set forth in claim 39 wherein the first fuel shot is delivered when the cylinder piston is displaced near top dead center during the intake stroke.

41. The method as set forth in claim 39 wherein the first fuel shot combusts during the compression stroke.

42. The method as set forth in claim 39 wherein the second fuel shot is delivered when the cylinder piston is positioned near top dead center during the compression stroke.

43. The method as set forth in claim 39 wherein the second fuel shot is delivered when the cylinder piston is positioned between a range from approximately 30° before top dead center to approximately 30° after top dead center during the compression stroke.

44. The method as set forth in claim 39 wherein the third fuel shot is delivered when the cylinder piston is positioned near top dead center during the compression stroke.

45. The method as set forth in claim 39 wherein the third fuel shot is delivered when the cylinder piston is positioned between a range from approximately 8° before top dead center to approximately 18° after top dead center during the compression stroke.

* * * * *